(12) United States Patent
Schürenberg et al.

(10) Patent No.: US 11,017,993 B2
(45) Date of Patent: May 25, 2021

(54) SEPARATION OF LIQUID IN DROPLETS AND SEDIMENTED MATERIAL ENCLOSED THEREIN

(71) Applicant: Bruker Daltonik GmbH, Bremen (DE)

(72) Inventors: Martin Schürenberg, Tarmstedt (DE); Alexander Vossgröne, Bremen (DE)

( * ) Notice: Subject to any disclaimer, the term of this patent is extended or adjusted under 35 U.S.C. 154(b) by 204 days.

(21) Appl. No.: 15/912,694

(22) Filed: Mar. 6, 2018

(65) Prior Publication Data
US 2018/0269050 A1    Sep. 20, 2018

(30) Foreign Application Priority Data
Mar. 16, 2017   (DE) .......................... 102017105600-9

(51) Int. Cl.
| | | |
|---|---|---|
| H01J 49/04 | (2006.01) | |
| B01L 3/00 | (2006.01) | |
| G01N 1/28 | (2006.01) | |

(52) U.S. Cl.
CPC ........ *H01J 49/0418* (2013.01); *B01L 3/5085* (2013.01); *G01N 1/2813* (2013.01); *B01J 2219/00315* (2013.01)

(58) Field of Classification Search
CPC .............................. B01L 3/0241; B01L 3/0262
See application file for complete search history.

(56) References Cited

U.S. PATENT DOCUMENTS

| | | | | |
|---|---|---|---|---|
| 5,756,050 | A * | 5/1998 | Ershow ...................... | B01J 4/02 422/501 |
| 6,051,190 | A * | 4/2000 | Birch .................... | B01L 3/0244 422/502 |
| 6,180,239 | B1 * | 1/2001 | Whitesides ........... | B01L 3/5085 101/368 |
| 6,228,659 | B1 * | 5/2001 | Kowallis .............. | B01J 19/0046 422/505 |

(Continued)

FOREIGN PATENT DOCUMENTS

| | | |
|---|---|---|
| CN | 102665917 A | 9/2012 |
| CN | 202610331 U | 12/2012 |

(Continued)

OTHER PUBLICATIONS

Starkey, T.A. et al., "Thin structured rigid body for acoustic absorption", Applied Physics Letters 110, 041902 (2017).

*Primary Examiner* — Brian R Gordon
(74) *Attorney, Agent, or Firm* — Benoit & Côté Inc.

(57) ABSTRACT

The invention relates to methods for drawing-off liquid from individual droplets which are in a predefined arrangement on a flat substrate and have sedimented material enclosed in them. A mask of an absorbent material comprising a pattern of indentations or holes which corresponds at least partially to the regular arrangement of the individual droplets, or a stiff, rigid plate of an absorbent material is positioned above the flat substrate in such a way that the droplets come into contact with the absorbent material peripherally so that liquid is drawn off there-into. The invention also relates to (Continued)

a mask of an absorbent material with a substantially rectangular shape which has a predefined pattern of indentations or holes for the purpose of separating liquid and sedimented material enclosed therein.

3 Claims, 3 Drawing Sheets

(56) References Cited

U.S. PATENT DOCUMENTS

| | | | | |
|---|---|---|---|---|
| 6,565,813 B1 * | 5/2003 | Garyantes | ........... | B01F 13/0071 |
| | | | | 422/553 |
| 6,762,061 B1 * | 7/2004 | Borrelli | ................ | B01J 19/0046 |
| | | | | 101/327 |
| 6,818,394 B1 * | 11/2004 | O'Donnell-Maloney | ................... | |
| | | | | C12Q 1/6858 |
| | | | | 435/6.11 |
| 6,827,905 B2 * | 12/2004 | Shanler | ................. | B01L 3/0244 |
| | | | | 422/503 |
| 6,884,626 B1 * | 4/2005 | Borrelli | .............. | G01N 35/1067 |
| | | | | 422/507 |
| 6,929,762 B2 * | 8/2005 | Rubin | ................... | B29C 59/002 |
| | | | | 264/293 |
| 7,211,209 B2 * | 5/2007 | Kim | ........................ | B82Y 30/00 |
| | | | | 264/129 |
| 7,604,983 B2 * | 10/2009 | O'Keefe | ............ | B01F 13/0084 |
| | | | | 435/287.2 |
| 8,142,850 B2 * | 3/2012 | Sreenivasan | ........... | B82Y 40/00 |
| | | | | 427/271 |
| 8,349,241 B2 * | 1/2013 | Sreenivasan | ........... | B82Y 10/00 |
| | | | | 264/319 |
| 10,725,020 B2 * | 7/2020 | Cheng | ................... | B01L 3/5088 |
| 10,865,434 B2 * | 12/2020 | Hallock | ................ | C12Q 1/6816 |
| 2002/0045270 A1 | 4/2002 | Schurenberg et al. | | |
| 2002/0051738 A1 | 5/2002 | Schürenberg | | |
| 2003/0118782 A1 | 6/2003 | Graff | | |
| 2012/0276575 A1 | 11/2012 | Fattinger et al. | | |

FOREIGN PATENT DOCUMENTS

| | | |
|---|---|---|
| CN | 203916151 U | 11/2014 |
| DE | 19754978 A1 | 7/1999 |
| DE | 19923761 C1 | 2/2001 |
| DE | 10043042 A1 | 3/2002 |
| DE | 20302263 U1 | 10/2004 |
| EP | 1053784 A2 | 11/2000 |
| EP | 1073522 B1 | 8/2003 |
| EP | 1594613 B1 | 5/2006 |
| JP | 403289469 A | 12/1991 |
| JP | 08224078 A | 9/1996 |

\* cited by examiner

SEPARATION OF LIQUID IN DROPLETS AND SEDIMENTED MATERIAL ENCLOSED THEREIN

BACKGROUND OF THE INVENTION

Field of the Invention

The invention relates to methods for drawing-off liquid from individual droplets which are in a predefined (especially regular) arrangement on a flat substrate and have sedimented material enclosed in them. The invention also relates to a mask of an absorbent material with a substantially rectangular shape which has a predefined (regular) pattern of indentations or holes for the purpose of separating liquid and sedimented material enclosed therein.

Description of the Related Art

There is a need to gently separate liquid from the sedimented material enclosed in it so that as little as possible of the sedimented material is removed together with the liquid in this separation process, while unsedimented (i.e. still suspended) constituents are also to be drawn off with the liquid.

The Prior Art is explained below with reference to a special aspect. This shall not be understood as a limitation, however. Useful further developments and modifications of what is known from the Prior Art can also be used above and beyond the comparatively narrow scope of this introduction, and will easily be evident to the expert skilled in the art in this field after reading the following disclosure.

Earlier tests have shown that microorganisms which are suspended in a droplet of nutrient liquid on a flat substrate accumulate in a sediment of microorganisms after a relatively short standing time (or "rest time") of up to one hour. The microorganisms which are sedimented there in a kind of "biofilm" can be carefully separated from the residual liquid and the remaining suspended particulate matter, by bringing an absorbent cloth into contact with the droplets, for example. After this "dehydration", the species of the microorganisms can be reliably determined with a subsequent mass spectrometric measurement, cf. international application PCT/DE2016/100561. This finding was astonishing because, contrary to expectation, it was found that the cell sediment of the microorganisms of interest was not removed together with the drawn off liquid. This finding allows the cultivation (or incubation) of microorganisms to promote growth and the preparation for an analytical measurement on one and the same substrate, such as a sample support plate for inserting into the ion source of a mass spectrometer.

As yet there is no fully developed scientific explanation for this microbial behavior in a droplet on a flat substrate. It is assumed, however, that physical interactions between the plate surface and the cells of the microorganisms, and adhesion processes caused by the biochemical and biophysical properties of the cell surface of the microorganisms, are responsible for the preferred attachment or sedimentation on the substrate.

Further objectives to be achieved by the invention will suggest themselves immediately to the person skilled in the art after reading the disclosure below.

SUMMARY OF THE INVENTION

The invention relates generally to methods and devices for drawing off liquid from individual droplets which are in a predefined (especially regular) arrangement on a flat substrate and have sedimented material enclosed in them.

In accordance with a first aspect, the invention relates to a method wherein a mask of an absorbent material which preferably has a pattern of indentations or holes corresponding at least in part to the predefined arrangement of the individual droplets, is positioned above the flat substrate in such a way that the center of the indentations or holes and the center of the droplets are substantially above one another in each case. The edges of the indentations or holes come into contact with peripheral parts of the individual droplets in each case, while the sedimented material remains untouched, and liquid is thus drawn off into the absorbent material.

A great advantage compared to the Prior Art is that the liquid from large numbers of (equal) droplets can be removed simultaneously with a mask of an absorbent material. As a flat substrate, a sample support plate can be coated with liquid droplets at several or even all sample spots, for example, and by applying the mask with the pattern of indentations or holes, the sedimented particles in all droplets can be separated simultaneously from the liquid, which would otherwise interfere with the further processing. Furthermore, the design of the mask with indentations or holes whose dimensions are adapted in the broadest sense to the size of the droplets to be absorbed, ensures that the liquid can be drawn off simultaneously over the whole circumference of the droplet (360°), which accelerates the process and optimizes the utilization of the liquid absorbency of the mask material.

A further advantage is that—unlike a plate or cloth of absorbent material without indentations or holes—the vertical separation between the absorbent material of the mask and the flat substrate can be chosen to be more or less as desired. It is even possible to choose the pressure with which the mask is applied to the flat substrate more or less as desired. This increases the robustness of the handling considerably. Other embodiments of the method using rigid, stiff plates of absorbent material, without being necessarily profiled with indentations or perforated with holes, will be described further below.

The droplets may, in particular, mainly contain liquid which is used in sample preparation methods and sample processing methods for infrared spectroscopy or mass spectrometry. The droplets may contain nutrient liquid, for example, and the sedimented material may comprise microorganisms cultivated in this droplet of nutrient liquid and then precipitated. Separating the nutrient liquid from sedimented microorganisms can, in particular, serve as a processing step of a sample for infrared-spectroscopic or mass-spectrometric identification (e.g. by means of IR transmission spectroscopy or MALDI time-of-flight mass spectrometry) according to species/subspecies, or other characterization of the microorganisms, such as the rapid determination of resistance/sensitivity of the microorganisms against antimicrobial substances.

The droplets may additionally or alternatively contain a washing liquid used for a sample processing procedure (for example an aqueous solution or pure de-ionized water) or other liquid processing media. For example, the washing liquid from sample spots which have been coated with a previously dried sample or with dried matrix substance and sample can be drawn off with the mask. The washing liquid is preferably chosen such that the matrix substance or the matrix crystal lattice with embedded sample crystals is not dissolved, e.g. with an α-cyano-4-hydroxycinnamic acid affinity preparation for in-situ desalting (cf. Gobom et al., Anal. Chem. 73, 2001, 434-438).

In various embodiments, a metal or ceramic plate can be used as the flat substrate. Possible plates are, particularly, polished stainless-steel plates or modifications thereof, such as the so-called anchor plates (AnchorChip™; Bruker Daltonik GmbH), which contain sequences of alternate, delimited lyophilic and lyophobic areas on a stainless steel substrate. The plate may be reusable or disposable.

In spectroscopic or mass spectrometric analysis in particular, 48, 96, 384 or 1536 individual droplets can be arranged in a predefined (and regular) pattern on the flat substrate. The sedimented material enclosed in the individual droplets may contain microorganisms, for example.

Usual droplet volumes can be approximately one to twelve microliters. These volumes in uniformly shaped droplets correspond roughly to a diameter of two to three millimeters above the flat substrate. It is of course also possible to design the flat substrate with preferred droplet spots, for example lyophilic circular areas in lyophobic surroundings. The diameter of the droplets will then adjust itself to match the dimension of the lyophilic circular area, as happens with standardized anchor plates of the AnchorChip™ type.

In various embodiments, the mask and the flat substrate can be moved slightly relative to each other (indicated as a slight horizontal wiping movement) to ensure all the individual droplets come into contact with the corresponding indentations or hole edges and thus ensure efficient removal (e.g. to take into account a lack of precision when applying the droplets). As soon as contact is made, the liquid is drawn off from the droplet in a very short time by means of the capillary forces of the absorbent material; the sedimented material, on the other hand, remains at the site on the flat substrate and can be further treated or processed.

An average droplet diameter can preferably be slightly larger than the diameter of an indentation or hole. If different droplet volumes are used for different procedures, it is possible to provide corresponding masks which are ready made in different sizes. In cases where the droplets are arranged on particularly hydrophilic patches in hydrophobic surroundings (e.g. AnchorChip™ plates), the diameters of the indentations or holes are correspondingly slightly smaller than the anchor patches.

A frame for the mask or a vertical guide for the flat substrate, into which the mask is inserted, can be provided and assists in guiding and aligning the mask as it is lowered onto the droplet array. The frame can be fixed to the mask, for example, by folding a projecting, custom-cut edge of the absorbent material and then impregnating it with a plastic material which then sets. The frame can also be attached to the outer circumference of the mask using an injection molded plastic.

In various embodiments of the methods, the mask may consist of a thick, flexible cloth of absorbent material being laterally mounted tensely in a surrounding holder frame (membrane-like).

According to a further embodiment, a rigid, stiff (and flat) plate of an absorbent material is positioned above the flat substrate using a spacer ridge, which is located laterally to the predefined arrangement, in such a way as to prevent the absorbent material and the flat substrate from establishing contact while facilitating protruding parts of the individual droplets coming into contact with the absorbent material as a result of which liquid is drawn off there-into. The spacer ridge may be designed and configured to keep a distance of about one third to about half the droplet diameter above the flat substrate surface, for instance. Primary advantages of this variant are that there is (i) no special alignment of the predefined arrangement and the rigid, stiff plate required and (ii) hardly any wear and tear of the flat substrate surface carrying the droplets since it works completely without physical contact.

It goes without saying that all features and implementations set out previously in the context of the first aspect do equally apply to this variant, if practicable.

By using the rigid, stiff plate and the spacer ridge, the sedimented particles in all droplets can be separated simultaneously from the liquid, which would otherwise interfere with the further processing. As soon as contact is made, the liquid is drawn off from the droplet in a very short time by means of the capillary forces of the absorbent material; the sedimented material, on the other hand, remains at the site on the flat substrate (untouched) and can be further treated or processed.

A flat substrate receptacle may be provided in which the flat substrate is accommodated and which comprises the spacer ridge, such as a ledger that surrounds the predefined arrangement over the full periphery (360°). Additionally or alternatively, the spacer ridge may be located at the plate surface near the plate edges facing the flat substrate, which would ease the design requirements for a receptacle, for instance. If different droplet volumes are used for different procedures, by way of example, it is possible to provide the rigid, stiff plates with corresponding spacer ridges which are ready made in different sizes.

In accordance with a second aspect, the invention relates to a mask of absorbent material of substantially rectangular shape which has a predefined (especially regular) pattern of indentations or holes.

The mask is preferably manufactured from a stiff, rigid material. It can be manufactured from profiled or perforated filter paper, non-woven material or cardboard, for example. Rigid materials are particularly suitable for automated procedures for drawing off liquid. Using specially adapted handling devices such as robot arms, the rigid masks can easily be removed from a storage place, clamped into an adapted holder, conveyed to the liquid removal stage and then set down in the required place, and disposed of, if required.

To produce the masks, it is possible to take a length of the absorbent material, cut off pieces of the mask of a size to suit the desired outer contour of the mask, and then press or cut the predefined pattern of indentations or holes into them, the latter by punching, for example. Particularly if it is to be used in a microbiology laboratory, it is advisable to choose the outer dimensions of the mask such that the liquid removed, together with any microorganisms which may possibly remain suspended in it, cannot penetrate to the outer edge or top of the mask, even when the liquid is completely absorbed, in order that the mask can still be gripped and moved without any risk of contamination.

BRIEF DESCRIPTION OF THE DRAWINGS

The invention can be better understood by referring to the following illustrations. The elements in the illustrations are not necessarily to scale, but are intended primarily to illustrate the principles of the invention (mainly schematically). In the illustrations, the same reference numbers designate corresponding elements in the different views.

DETAILED DESCRIPTION

While the invention has been illustrated and explained with reference to a number of different embodiments, those skilled in the art will recognize that various changes in form and detail may be made to it without departing from the scope of the technical teaching as defined in the appended claims.

Figure 1:
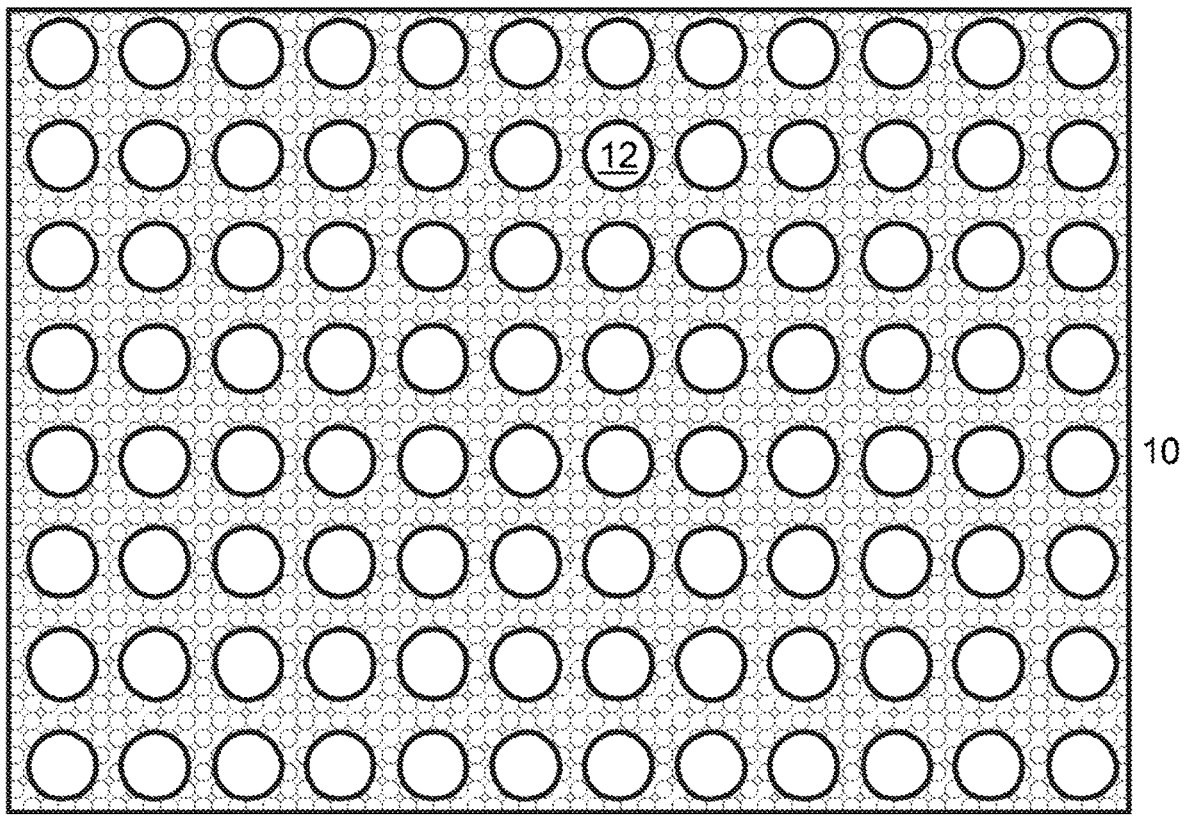
FIG. 1 is a schematic diagram of an example embodiment for a mask of an absorbent material with 96 holes (arranged in 8 rows and 12 columns).

FIG. 1 depicts a plan view of a mask of rectangular form (10), which has an array of 96 holes (12) arranged in a nine-millimeter grid in an arrangement of eight rows by twelve columns. Smaller (e.g. 48) or larger (e.g. 384) arrays are also conceivable, however. The array can generally correspond to the arrangement of sample spots on a conventional, standardized sample support for ionization by means of matrix assisted laser desorption (MALDI). The dimensions of the mask (10) can be 127.76 mm (length)× 85.48 mm (width), corresponding to a microtitration plate, with a thickness of around two to five millimeters.

Figure 2A:
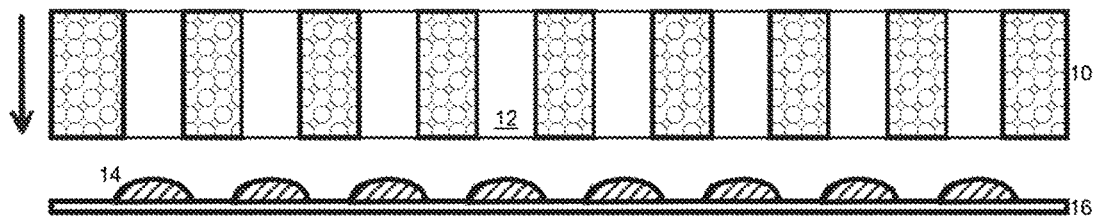
FIGS. 2A-2C give a schematic illustration of an embodiment of the methods.
Figure 2B:
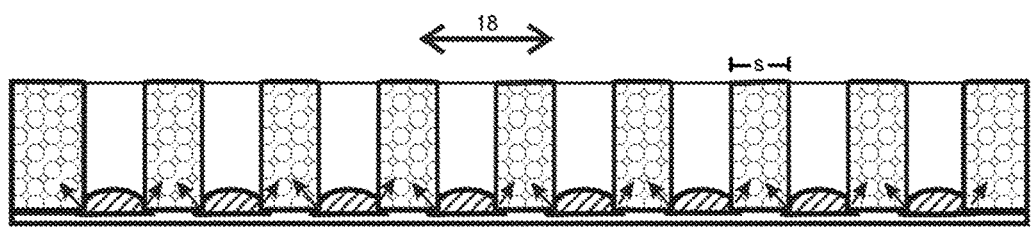

FIG. 2A shows an arrangement of equal droplets (14) in a row of eight on a flat substrate which can correspond to a MALDI sample support plate (16). A mask (10) of an absorbent material, which has an array of holes (12) arranged opposite all the droplets (14), is positioned above the flat substrate. Each sample spot on the support plate (16) thus has a hole opposite it (12). The mask (10) is moved slowly towards the substrate, whereby the droplets (14) come into contact with the absorbent material at the hole edges once the mask has been lowered to a certain point so that the liquid is removed from the droplets (14) laterally via capillary forces, FIG. 2B.

This lowering movement may end when the mask (10) is lying on the flat substrate, as depicted; it is also possible to keep the mask (10) slightly above the substrate without coming into contact. This can prevent a lateral spread of droplet liquid in the gap between mask (10) and substrate, which could lead to the mutual contamination of the individual droplets (14). To ensure that each droplet (14), even when it is applied slightly asymmetrically or does not cover the whole sample spot, comes into contact with the absorbent material of the mask (10), the mask (10) can be moved laterally to and fro slightly, as indicated by the double-headed arrow (18).

Figure 2C:
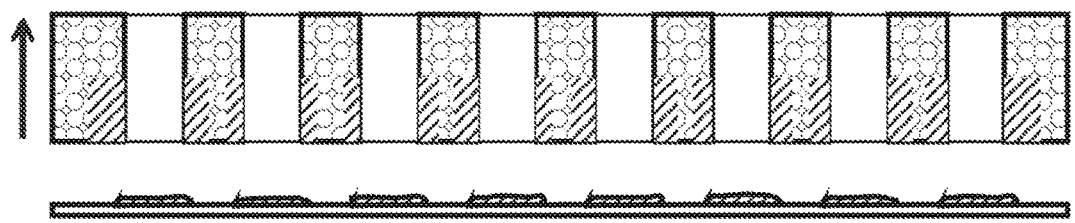

The lateral absorption of the liquid from the droplet, starting from the middle of the droplet, is completed in a very short time, usually a few seconds up to around one minute at the most. Afterwards, the mask (10) can be lifted again and removed, FIG. 2C. The liquid removed is safely held in the capillary matrix of the mask (10), so there is no danger that it will drop out again as it is being lifted and contaminate the flat substrate. On the contrary, it is a very safe and reliable way to remove the liquid. The partially saturated mask (10) is typically disposed of as a consumable, which is advantageous particularly for applications in microbiology. It could also be washable and then re-usable where appropriate, however.

Sedimented material, such as microorganisms, which is enclosed in the droplets (14) is not removed when the liquid is gently drawn off with the aid of capillary forces. It does not come into contact with the edges of the holes (12) (or indentations), but remains in the center of the spot on the surface of the flat substrate on which the droplets (14) were deposited. The sedimented material, now largely free of liquid, is thus available for further processing such as sample preparation for ionization by means of matrix assisted laser desorption or similar process steps.

Figure 3:
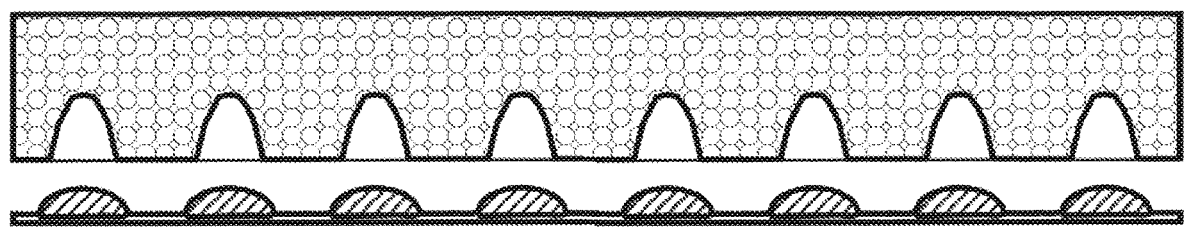
FIG. 3 is a schematic diagram of an example embodiment for a mask of an absorbent material with indentations instead of holes.

FIG. 3 shows a schematic side view of a row of eight indentations which have, for example, been pressed into a stiff and rigid mask fabric such as non-woven material. When the indentations are designed appropriately and adapted to the expected droplet shape, the liquid can be made to come into contact not only with the edge (as with the hole version) but also with the bottom of the indentation, or at least parts of the indentation surface, which may further accelerate the removal process. Since the droplets are not visible through the mask in this embodiment, care must be taken that the mask is aligned correctly—particularly when this is done manually—with the array of droplets on the flat substrate.

In a preferred embodiment, the dimensions of the strips between the indentations or holes, compared to the spacing of the indentations or holes themselves, are chosen such that the liquids absorbed from the different individual droplets do not run into each other, thus preventing cross-contamination. Furthermore, the thickness of the mask and the width of the side edge are preferably dimensioned so that the liquid is not drawn right to the top or the edges. If we assume cylindrical droplets with a volume $\pi r^2 \times h$ as our model (r=droplet radius; h=droplet height), which is drawn into a cylindrical ring around a hole, which for simplicity has the same volume $2\pi r \times dr \times h$, then the ratio of ring width dr to droplet radius is given by dr/r=0.5. This means that there is no mutual penetration of liquids of neighboring individual droplets when the width of the strips is given by: s>2×dr=2× 0.5×r=r. According to this simple model, the strip width is therefore preferably chosen to be larger than half the hole diameter (or indentation diameter). Similar considerations can be applied to the mask edge and the mask thickness.

Figure 4A:
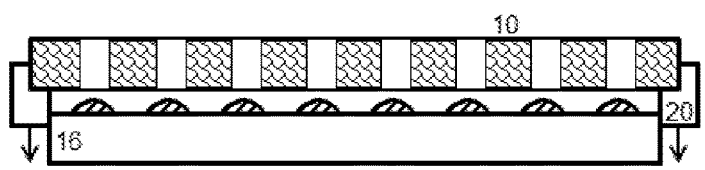
FIGS. 4A and 4B provide a schematic illustration of the use of a mask with corresponding frame or vertical guide for the purpose of alignment and guidance.

To make the mask (10) easier to handle, it can be inserted or clamped into a frame (20). The frame (20) can be dimensioned so as to create a flush fit around a sample support (16) which contains the array of droplets, for example, as depicted in FIG. 4A. It can be designed as a disposable article, which is disposed of together with the saturated mask (10), or can be washable and re-usable. Possible designs encompass a frame (20) with stepped inner contour, on which the mask (10) can be placed with friction locking. If the frame (20) slides down around the outer sample support contour, as depicted, contact with the liquid is established below a certain point. The frame (20) has furthermore the advantage that it provides reliable alignment and guidance of the array of holes relative to the array of droplets. If the inner contour of the frame (20) and the outer contour of the sample support (16) are not dimensioned so as to be completely flush, but have a certain amount of play, a slight lateral movement can be executed to guarantee that the liquid of all droplets comes into contact with the mask.

In an alternative embodiment, the frame can be fixed to the mask. A projecting, custom-cut edge of the absorbent material can be folded and then impregnated with a plastic material, for example, which then sets to ensure stability and rigidity (monolithic version). The frame can, if appropriate, also be attached to the outer circumference of the mask using an injection molded plastic.

Figure 4B:
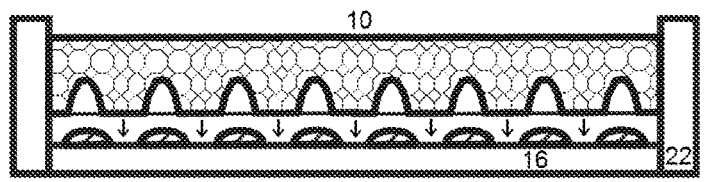

In a version sketched in FIG. 4B, a sample support (16), as a flat substrate which supports the array of droplets, can be inserted into a vertical guide (22) which surrounds it on all sides. The mask (10) can then have similar dimensions to the sample support (16) and slide slowly downwards onto the sample support (16) from the top opening of the vertical guide. Grip recesses in the walls of the vertical guide (not shown here) can facilitate the insertion and removal of sample support (16) and mask (10).

Figure 5A:
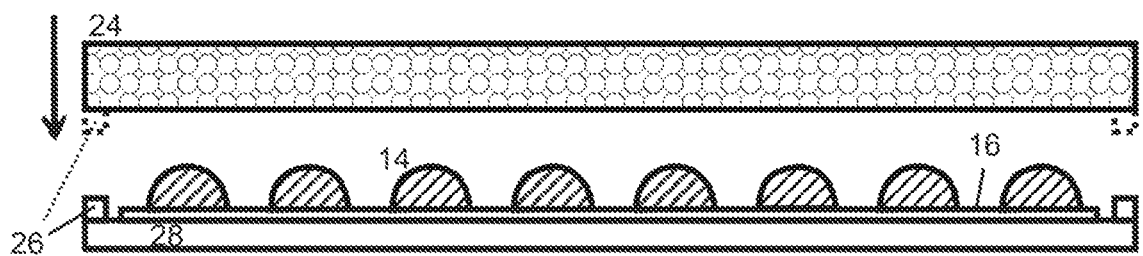
FIGS. 5A-5C present another schematic illustration of a further embodiment of the methods.
Figure 5B:
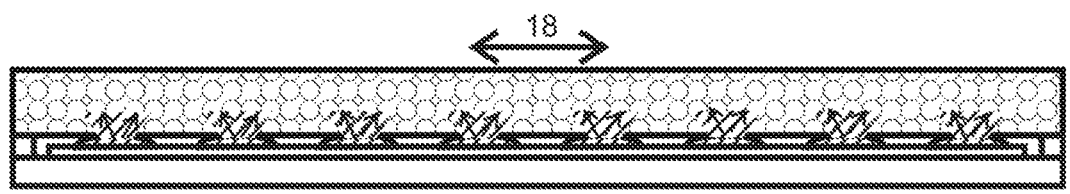

In another implementation of the principles set out herein, FIG. 5A shows again an arrangement of equal droplets (14) in a row of eight on a flat substrate which can correspond to a MALDI sample support (16), similar to FIG. 2A. A rigid, stiff plate (24) of an absorbent material, without any profile, is positioned above the flat substrate. The plate (24) is moved slowly towards the substrate, whereby the protruding parts of the droplets (14) come into contact with the absorbent material once the plate (24) has been lowered to come to rest on the spacer ridge (26), which is located laterally at a receptacle (28) accommodating the flat substrate. The distance above the flat substrate surface kept by the spacer ridge (26) can amount to about one third to about half the droplet diameter, for example. The peripheral contact facilitates the removal of liquid from the droplets (14) via capillary forces, FIG. 5B. No special alignment of plate (24) and droplets (14) is necessary in this variant.

Instead of locating the spacer ridge at a receptacle (28), it could also be mounted laterally on the surface of the rigid, stiff plate (24) facing the flat substrate itself, as indicated by the dotted contour. This alternative design affords better adaptability to different droplet sizes, in particular when the plate (24) is designed as a consumable. To accelerate the aspiration of the liquid into the absorbent material of the rigid, stiff plate (24) at the points of contact, the plate (24) can be moved laterally to and fro slightly, as indicated by the double-headed arrow (18).

Figure 5C:
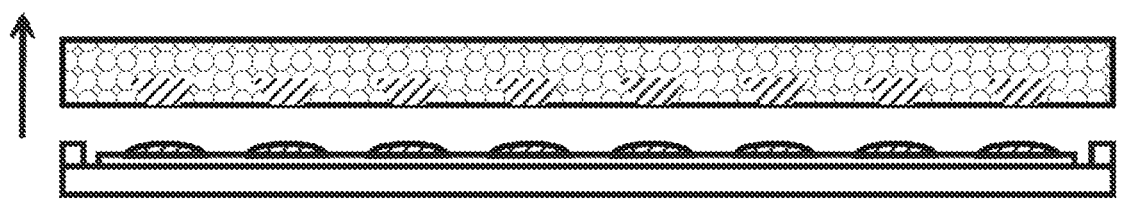

As expounded before, the absorption of the liquid from the droplets (14) is completed in a very short time, usually a few seconds up to around one minute at the most. Afterwards, the partly saturated plate (24) can be lifted again and removed, FIG. 5C. The liquid removed is safely held in the capillary matrix of the plate (24), so there is no danger that it will drop out again as it is being lifted and contaminate the flat substrate. On the contrary, it is a very safe and reliable way to remove the liquid.

Sedimented material, such as microorganisms, which is enclosed in the droplets (14) is not removed when the liquid is gently drawn off with the aid of capillary forces. By virtue of the spacer ridge (26) which keeps the surface of the rigid, stiff plate (24) at a distance, for example about one third to about half a droplet diameter above the flat substrate, it does not come into contact with the absorbent material of the plate (24) at all, but remains in the center of the spot on the surface of the flat substrate on which the droplets (14) were deposited. The sedimented material, now largely free of liquid, is thus available for further processing such as sample preparation for ionization by means of matrix assisted laser desorption or similar process steps, as has been explained before.

Further embodiments of the invention are conceivable in addition to the designs described by way of example. With knowledge of this disclosure, the person skilled in the art is easily able to design further, advantageous sample processing methods for infrared spectroscopic or mass spectrometric measurement using a desorbing ionization method, which are to be contained in the scope of protection of the claims, including any possible equivalents as the case may be.

The invention claimed is:

1. A method for drawing-off liquid from individual droplets which are in a predefined arrangement on a surface of a flat substrate and have sedimented material enclosed in them, the method comprising:
providing a rigid plate of an absorbent material above the flat substrate;
providing a spacer ridge that has a fixed location relative to one of the flat substrate and the rigid plate, and that extends a predetermined distance in a first direction between the substrate and the rigid plate, wherein the spacer ridge is configured to keep the rigid plate at a distance of one-third to one-half of a diameter of a droplet of the individual droplets, above the surface of the flat substrate; and
reducing a relative distance between the rigid plate and the flat substrate along the first direction until the spacer ridge obstructs further relative movement between the rigid plate and the flat substrate and prevents contact between the absorbent material and the flat substrate, while the individual droplets contact the absorbent material; and as a result of such, at least a portion of droplet liquid is drawn off of the flat substrate by the absorbent material.

2. The method according to claim 1, wherein the flat substrate is located in a flat substrate receptacle which comprises the spacer ridge.

3. The method according to claim 1, wherein the spacer ridge is fixed to a surface of the rigid plate.

* * * * *